United States Patent
Hartnagel et al.

(10) Patent No.: US 12,398,654 B2
(45) Date of Patent: Aug. 26, 2025

(54) TURBINE ASSEMBLY WITH CASE-INTEGRATED COOLED CLEARANCE MEASUREMENT SYSTEM

(71) Applicant: Rolls-Royce North American Technologies Inc., Indianapolis, IN (US)

(72) Inventors: Brett Hartnagel, Indianapolis, IN (US); Brandon R. Snyder, Indianapolis, IN (US); Trevor C. Pfeil, Indianapolis, IN (US); Rex M. Little, Indianapolis, IN (US)

(73) Assignee: Rolls-Royce North American Technologies Inc., Indianapolis, IN (US)

( * ) Notice: Subject to any disclaimer, the term of this patent is extended or adjusted under 35 U.S.C. 154(b) by 26 days.

(21) Appl. No.: 18/372,435

(22) Filed: Sep. 25, 2023

(65) Prior Publication Data

US 2025/0101876 A1  Mar. 27, 2025

(51) Int. Cl.
*F01D 11/24* (2006.01)
*F01D 17/02* (2006.01)
*G01B 21/16* (2006.01)

(52) U.S. Cl.
CPC .............. *F01D 11/24* (2013.01); *F01D 17/02* (2013.01); *G01B 21/16* (2013.01); *F05D 2220/32* (2013.01); *F05D 2240/55* (2013.01); *F05D 2260/20* (2013.01); *F05D 2260/80* (2013.01)

(58) Field of Classification Search
None
See application file for complete search history.

(56) References Cited

U.S. PATENT DOCUMENTS

| | | |
|---|---|---|
| 7,207,769 B2 | 4/2007 | Tanioka |
| 7,414,413 B2 | 8/2008 | Crum |
| 7,540,704 B2 * | 6/2009 | Shang ..................... F01D 11/06 415/118 |
| 7,554,324 B2 * | 6/2009 | Gualtieri ................. F01D 17/02 324/207.16 |
| 7,922,441 B2 | 4/2011 | Shang |
| 8,322,973 B2 | 12/2012 | Shang |
| 8,773,115 B2 | 7/2014 | Phillips et al. |
| 8,773,155 B2 | 7/2014 | Yang |
| 8,827,630 B2 | 9/2014 | Shang |
| 8,894,358 B2 | 11/2014 | Bacic |

(Continued)

FOREIGN PATENT DOCUMENTS

CN  111043949  4/2021

OTHER PUBLICATIONS

Yu et al., A review of blade tip clearance-measuring technologies for gas turbine engines, Measurement and Control, Mar. 2020, vol. 53(3-4) 339-357.

*Primary Examiner* — Juan G Flores
(74) *Attorney, Agent, or Firm* — Barnes & Thornburg (57) ABSTRACT

A turbine assembly includes a bladed rotor mounted for rotation about an axis of the gas turbine engine, a case assembly, and a tip clearance system. The tip clearance system includes a tip clearance sensor located in an annular plenum defined between an inner case and an outer case included in the case assembly. The tip sensor is configured to monitor a tip clearance formed between the bladed rotor and the case assembly during operation of the gas turbine engine.

10 Claims, 7 Drawing Sheets

(56) References Cited

U.S. PATENT DOCUMENTS

| | | |
|---|---|---|
| 10,393,149 B2 | 8/2019 | Mondal |
| 11,225,880 B1 | 1/2022 | Shoemaker |
| 2005/0088171 A1* | 4/2005 | Gualtieri ................ G01B 7/14 |
| | | 324/600 |
| 2011/0188994 A1* | 8/2011 | Shang .................... F01D 11/20 |
| | | 415/118 |
| 2014/0064924 A1 | 3/2014 | Warren |

* cited by examiner

TURBINE ASSEMBLY WITH CASE-INTEGRATED COOLED CLEARANCE MEASUREMENT SYSTEM

FIELD OF THE DISCLOSURE

The present disclosure relates generally to gas turbine engines, and more specifically to rotor tip gap systems.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine.

Compressors and turbines typically include alternating stages of static vane assemblies and rotating wheel assemblies. The rotating wheel assemblies include disks carrying blades around their outer edges. When the rotating wheel assemblies turn, tips of the blades which may incorporate a shroud move in close proximity to blade tracks that are attached to, or incorporated into the inner diameter of the turbine case arranged around the rotating wheel assemblies.

During operation, the tips of the blades included in the rotating wheel assemblies move inwardly and outwardly relative to a centerline of the engine due to changes in centrifugal force and temperatures experienced by the blades and the wheel. Similarly, the case and blade tracks may also move inwardly and outwardly relative to a center axis of the gas turbine engine due to changes in temperature during engine operation. Because of this movement inwardly and outwardly relative to the centerline, the case around the blades may be designed to minimize clearance between the blade tips and the blade tracks. This clearance may allow combustion products to pass over the blade tips without pushing the blades, thereby contributing to lost performance within a gas turbine engine.

SUMMARY

The present disclosure may comprise one or more of the following features and combinations thereof.

A turbine assembly adapted for use in a gas turbine engine may include a bladed rotor, a case assembly, and a cooled tip clearance measurement system. The bladed rotor may be mounted for rotation about an axis of the gas turbine engine. The case assembly may extend circumferentially around the bladed rotor.

In some embodiments, the case assembly includes an inner case and an outer case. The inner case may extend circumferentially around the bladed rotor to define an outer boundary of a gas path of the turbine assembly to block combustion products from moving through the gas path of the turbine assembly without interaction with blades on the bladed rotor. The outer case may extend circumferentially around the inner case. The outer case may be spaced radially outward of the inner case to define an annular cooling plenum therebetween. The annular cooling plenum may be configured to be flooded with cooling air at a temperature lower than a temperature of the combustion products.

In some embodiments, the cooled tip clearance measurement system may include the annular cooling plenum defined between the inner case and the outer case and a tip clearance sensor located in the annular cooling plenum to engage the inner case radially outward of the gas path of the turbine assembly. The tip clearance sensor may be configured to monitor a tip clearance formed between the bladed rotor and the inner case during operation of the gas turbine engine.

The tip clearance sensor may include a sensor housing and a plurality of housing stand-offs. The sensor housing may define a radially-inwardly facing surface. The plurality of housing stand-offs may extend from the radially-inwardly facing surface of the sensor housing and engage the inner case to space the radially-inwardly facing surface apart from the inner case to define a gap therebetween. The gap may allow the flow of cooling air to flow between the inner case and at least a portion of the radially-inwardly facing surface of the sensor housing.

In some embodiments, the inner case may be formed to define a cooling hole that extends radially through the inner case. The cooling hole may open to the gap and the gas path so that the gap is in fluid communication with the gas path.

In some embodiments, the sensor housing may include a thermal barrier coating layer. The thermal barrier coating layer may define the radially-inwardly facing surface of the sensor housing. In some embodiments, the plurality of stand-offs may each include a thermal barrier coating layer that engages the inner case.

In some embodiments, the tip clearance sensor may include a sensor housing that defines a radially-inwardly facing surface that directly engages the inner case. The sensor housing may include a thermal barrier coating layer that defines the radially-inwardly facing surface of the sensor housing.

In some embodiments, the tip clearance sensor may further include a plurality of protrusions that extend away from the sensor housing into the annular cooling plenum. The plurality of protrusions may be configured to increase the surface area in contact with, and induce turbulence in the flow of cooling air supplied to the annular cooling plenum between the outer case and the inner case during operation of the gas turbine engine such that heat is more effectively transferred from the tip clearance sensor to the flow of cooling air.

According to another aspect of the present disclosure, a gas turbine engine may include a compressor configured to compress air drawn in to the gas turbine engine and discharge pressurized air, a combustor configured to mix fuel with the pressurized air from the compressor and ignites the fuel to produce hot, high pressure combustion products, and a turbine assembly configured to receive the combustion products and to extract mechanical work form the combustion products as the combustion products move through the turbine assembly. The turbine assembly may include a bladed rotor mounted for rotation about an axis of the gas turbine engine, a case assembly that extends circumferentially around the bladed rotor, and a cooled tip clearance measurement system.

In some embodiments, the case assembly may include an inner case and an outer case. The inner case may extend circumferentially around the bladed rotor. The outer case may extend circumferentially around the inner case. The outer case may be spaced radially outward of the inner case to define an annular cooling plenum therebetween.

In some embodiments, the cooled tip clearance measurement system may include the annular cooling plenum defined between the inner case and the outer case, a tip clearance sensor located in the annular cooling plenum to engage the inner case, and a cooling air source in fluid communication with the annular cooling plenum to supply a flow of cooling air to the annular cooling plenum to transfer heat from the tip clearance sensor to the flow of cooling air so as to cool the tip clearance sensor during operation of the gas turbine engine. The tip clearance sensor may be configured to monitor a tip clearance formed between the bladed rotor and the inner case.

In some embodiments, the tip clearance sensor may include a sensor housing and a plurality of housing stand-offs. The sensor housing may define a radially-inwardly facing surface. The plurality of housing stand-offs may extend from the radially-inwardly facing surface of the sensor housing and engage the inner case to space the radially-inwardly facing surface apart from inner case to define a gap therebetween. The gap may allow the flow of cooling air to flow between the inner case and the radially-inwardly facing surface of the sensor housing.

In some embodiments, the inner case may be formed to define a cooling hole that extends radially through the inner case. The cooling hole may open to the gap and a gas path of the gas turbine engine so that the gap is in fluid communication with the gas path.

In some embodiments, the sensor housing may include a thermal barrier coating layer. The thermal barrier coating layer may define the radially-inwardly facing surface of the sensor housing. In some embodiments, the plurality of stand-offs may each include a thermal barrier coating layer that engages the inner case.

In some embodiments, the tip clearance sensor may include a sensor housing that defines a radially-inwardly facing surface that directly engages the inner case. The sensor housing may include a thermal barrier coating layer that defines the radially-inwardly facing surface of the sensor housing.

In some embodiments, the tip clearance sensor may further include a plurality of protrusions. The plurality of protrusions may extend away from the sensor housing into the annular cooling plenum.

In some embodiments, the cooling air source may be air from the compressor. In some embodiments, the cooling air source may be from another section of the engine.

According to another aspect of the present disclosure, a method may include providing a turbine assembly adapted for use in a gas turbine engine. The turbine assembly may include a bladed rotor mounted for rotation about an axis of the gas turbine engine, a case assembly, and a cooled tip clearance measurement system.

In some embodiments, the case assembly may include an inner case and an outer case. The inner case may extend circumferentially around the bladed rotor. The outer case may extend circumferentially around the inner case. The outer case may be spaced radially outward of the inner case to define an annular cooling plenum therebetween.

In some embodiments, the cooled tip clearance measurement system may include the annular cooling plenum defined between the inner case and the outer case, a tip clearance sensor located in the annular cooling plenum to engage the inner case, and a cooling air source in fluid communication with the annular cooling plenum to supply a flow of cooling air to the annular cooling plenum.

In some embodiments, the method may further include monitoring a tip clearance formed between the bladed rotor and the inner case during operation of the gas turbine engine. The method may further include conducting the flow of cooling air into the annular cooling plenum from the cooling air source to transfer heat from the tip clearance sensor to the flow of cooling air so as to cool the tip clearance sensor during operation of the gas turbine engine.

In some embodiments, the tip clearance sensor may include a sensor housing that defines a radially-inwardly facing surface and a plurality of housing stand-offs. The plurality of housing stand-offs may extend from the radially-inwardly facing surface of the sensor housing and engage the inner case to space the radially-inwardly facing surface apart from inner case to define a gap therebetween. The gap may allow the flow of cooling air to flow between the inner case and the radially-inwardly facing surface of the sensor housing.

These and other features of the present disclosure will become more apparent from the following description of the illustrative embodiments.

BRIEF DESCRIPTION OF THE DRAWINGS

FIG. 3 is a cross-section view of the turbine section of FIG. 2 showing the cooled tip clearance measurement system includes an annular cooling plenum defined between the inner case and the outer case, a tip clearance sensor located in the annular cooling plenum to engage the inner case, and a cooling air source in fluid communication with the annular cooling plenum to supply a flow of cooling air to the annular cooling plenum to transfer heat from the sensor to the cooling air so as to cool the sensor during operation of the gas turbine engine, and further showing the sensor includes a sensor housing that defines a radially-inwardly facing surface and a plurality of housing stand-offs that extend from the radially-inwardly facing surface of the sensor housing and engage the inner case to space the radially-inwardly facing surface apart from inner case to define a gap therebetween to allow the flow of cooling air to flow between the inner case and the radially-inwardly facing surface of the sensor housing and out through a cooling hole formed in the inner case into the gas path;

DETAILED DESCRIPTION OF THE DRAWINGS

For the purposes of promoting an understanding of the principles of the disclosure, reference will now be made to a number of illustrative embodiments illustrated in the drawings and specific language will be used to describe the same.

Figure 1:
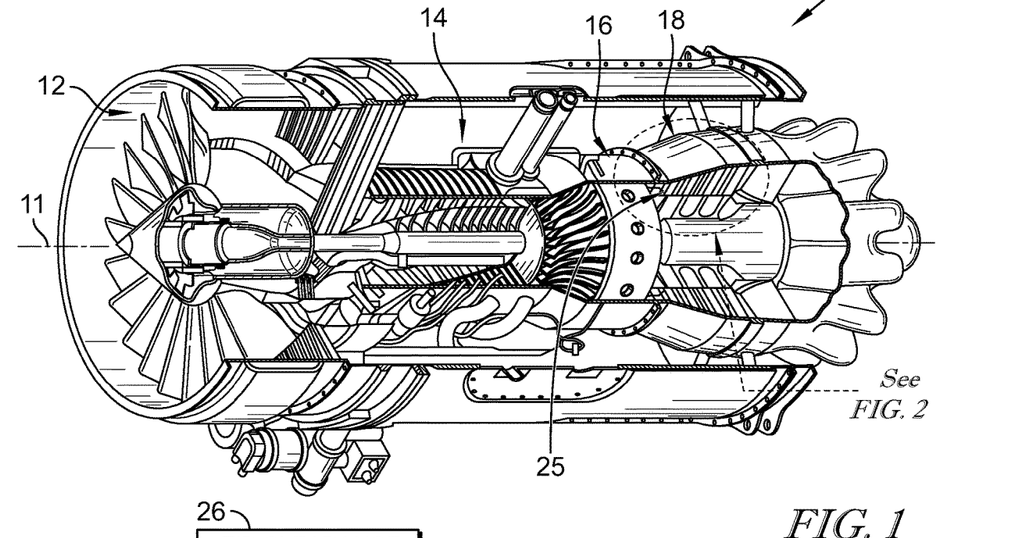
FIG. 1 is a cutaway perspective view of a gas turbine engine that includes a fan, a compressor, a combustor, and a turbine, the turbine including a turbine section comprising a plurality of bladed rotor assemblies configured to rotate about a central axis of the gas turbine engine and a plurality of static vane assemblies in between each bladed rotor assembly.

An illustrative aerospace gas turbine engine 10 includes a fan 12, a compressor 14, a combustor 16, and a turbine 18 as shown in FIG. 1. The fan 12 is driven by the turbine 18 and provides thrust for propelling an air vehicle. The compressor 14 compresses and delivers air to the combustor 16. The combustor 16 mixes fuel with the compressed air received from the compressor 14 and ignites the fuel. The hot, high-pressure products of the combustion reaction in the combustor 16 are directed into the turbine 18 to cause the turbine 18 to rotate about an axis 11 and drive the compressor 14 and the fan 12. In some embodiments, the fan 12 may be replaced with a propeller, drive shaft, or other suitable configuration.

Figure 2:
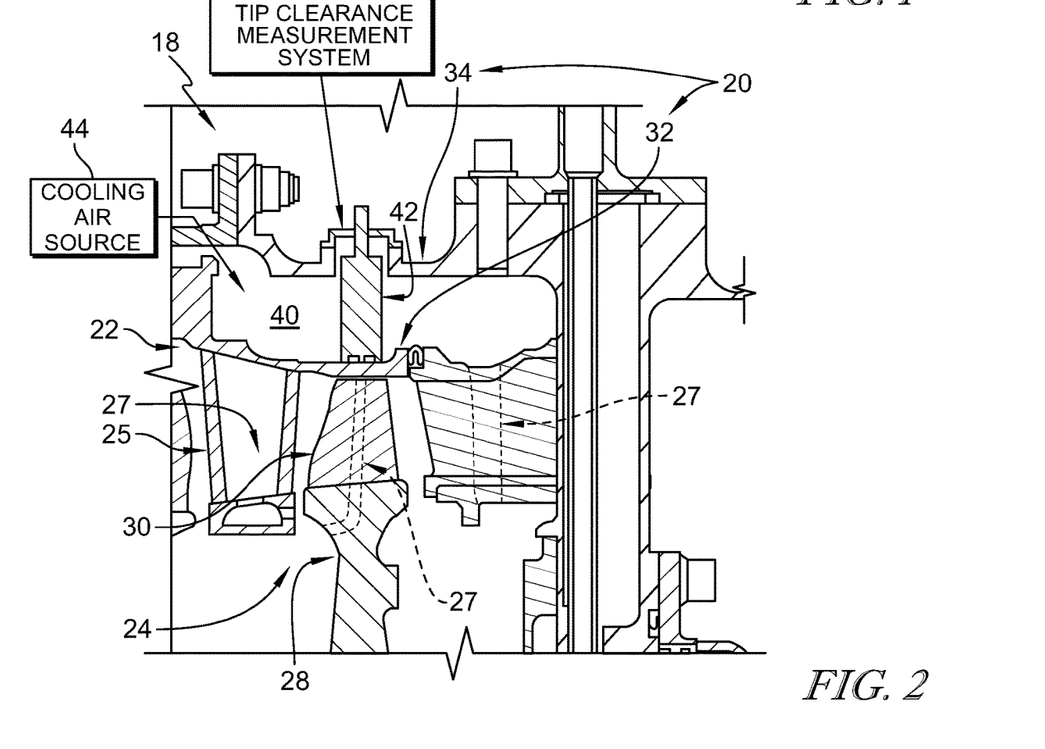
FIG. 2 is a cross-sectional view of a portion of the turbine section of the gas turbine engine of FIG. 1 showing the turbine section further includes a case assembly having an inner case that extends circumferentially around the bladed rotor assemblies and static vanes assemblies to define an outer boundary of a gas path of the gas turbine engine and an outer case that extends circumferentially around the inner case radially outward of the inner case and a cooled tip clearance measurement system configured to monitor the blade tip clearance between the bladed rotor and the case assembly.

The turbine 18 includes a case assembly 20, static turbine vane assemblies 22, rotating bladed rotor assemblies 24 between adjacent turbine vane assemblies 22, and a cooled tip clearance measurement system 26 as shown in FIG. 2. The case assembly 20 extends circumferentially around the axis 11 of the gas turbine engine 10. Each bladed rotor assembly 24 has a rotor 28 mounted for rotation about the axis 11 of the gas turbine engine 10 and a plurality of blades 30 coupled to the rotor 28 for rotation therewith. The cooled tip clearance measurement system 26 is configured to monitor the blade tip clearance T as shown in FIG. 3 between the bladed rotor 24 and the case assembly 20.

Figure 3:
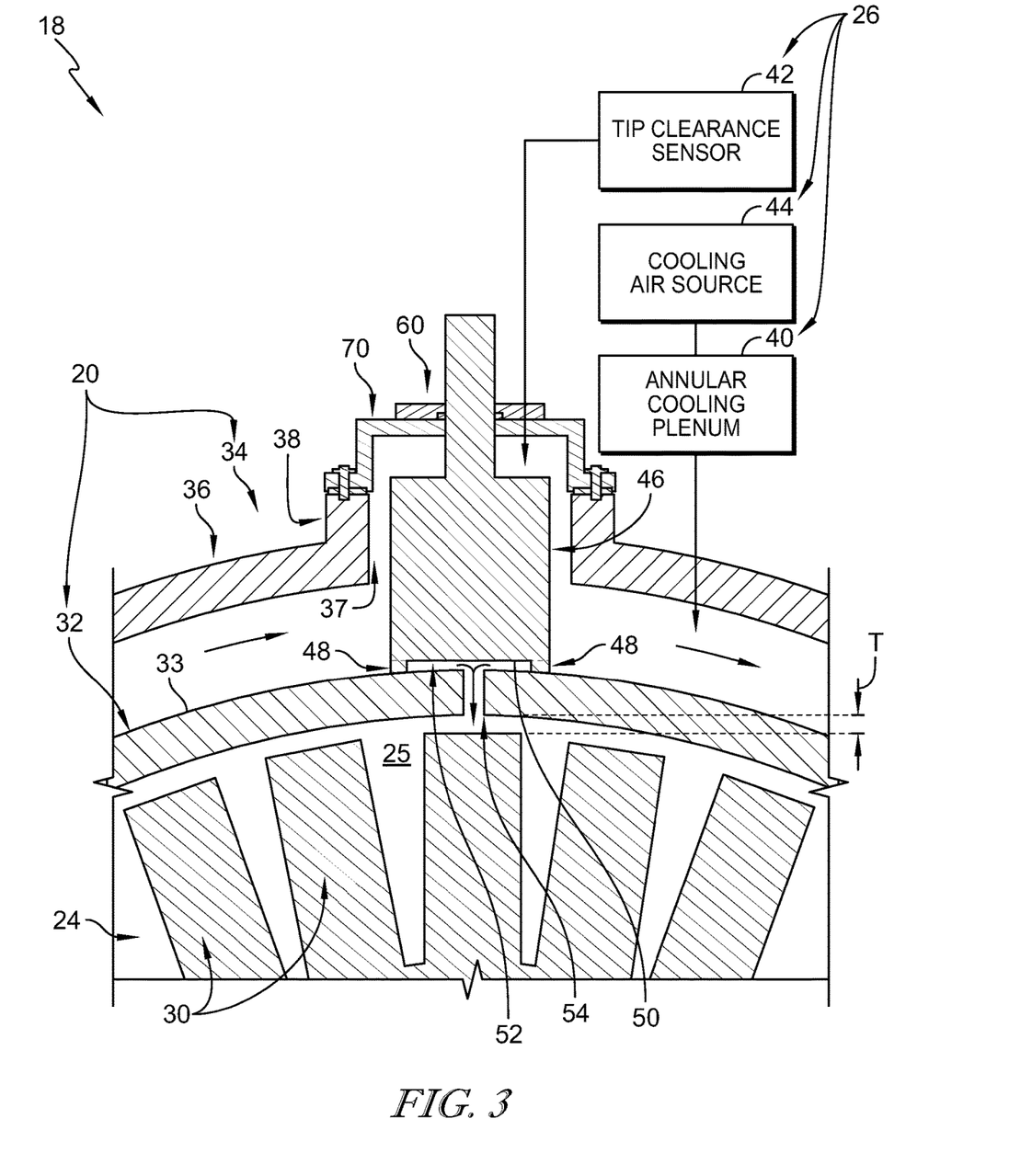

The case assembly 20 includes an inner case 32 and an outer case 34 as shown in FIGS. 2 and 3. The inner case 32 extends circumferentially around the bladed rotor 24 to define an outer boundary of a gas path 25 of the turbine assembly 18. The inner case 32 extends circumferentially around the bladed rotor 24 to block combustion products from moving through the gas path 25 of the turbine assembly 18 without interaction with the blades 30 on the bladed rotor 24. The outer case 34 extends circumferentially around the inner case 32 radially outward of the inner case 32.

The cooled tip clearance measurement system 26 includes an annular cooling plenum 40 and a tip clearance sensor 42 as shown in FIGS. 2 and 3. The annular cooling plenum 40 is defined between an inner case 32 and an outer case 34 included in the case assembly 20. The tip clearance sensor 42 is located in the annular cooling plenum 40 to engage the inner case 32 radially outward of the gas path 25 of the turbine assembly 18.

The annular cooling plenum 40 is configured to be flooded with cooling air to cool the sensor 42. The cooling air supplied to the annular cooling plenum 40 has a temperature lower than the temperature of the combustion products from the combustor 16. The cooling air transfers heat from the sensor 42 to the cooling air so as to cool the sensor during operation of the gas turbine engine. In the illustrative embodiment, the cooled tip clearance measurement system 26 includes a cooling air source 44 in fluid communication with the annular cooling plenum 40 to supply a flow of cooling air to the annular cooling plenum 40.

The distance between the tips of the blades included in the bladed rotor 24 and the surrounding case may be important to gas turbine engine performance. Sensors 42 may be used to monitor the tip clearance T during engine operation. Sensors 42 may also be incorporated into an active control system which may measure and adjust the turbine tip clearance T for optimum performance.

The sensor 42 is configured to monitor a tip clearance T formed between the bladed rotor 24 and the inner case 32 during operation of the gas turbine engine 10. To provide an accurate measurement, the sensor 42 needs to remain in contact with an inner case 32 of the case assembly 20, which carries the blade track. Temperatures in this region of the engine 10 may exceed the capability of electronic or magnetic sensor components; therefore, the sensor 42 may need to be cooled.

The sensor 42 includes a sensor housing 46 and a plurality of stand-offs 48 as shown in FIG. 3. The sensor housing 46 houses the other sensor components. The sensor housing 46 defines a radially-inwardly facing surface 50. The plurality of housing stand-offs 48 that extend from the radially-inwardly facing surface 50 of the sensor housing 46 and engage the inner case 32 to space the radially-inwardly facing surface 50 apart from inner case 32 to define a gap 52 therebetween. The gap 52 between the radially-inwardly facing surface 50 and the inner case 32 to allow the flow of cooling air to flow between the inner case 32 and the radially-inwardly facing surface 50 of the sensor housing 46.

The plurality of housing stand-offs 48 maintain contact with the inner case 32 of the case assembly 20 as shown in FIG. 3. The stand-offs 48 engage a radially-outwardly facing surface 33 of the inner case 32.

In the illustrative embodiment, the plurality of housing stand-offs 48 are castellated as shown in FIGS. 2 and 3. The plurality of housing stand-offs 48 are spaced apart from one another or castellated to define openings to the gap 52 so that the cooling air may flow between the inner case 32 and at least a portion of the radially-inwardly facing surface 50 of the sensor housing 46.

Turning back to the turbine section 18, the cooling air source 44 is a portion of the compressed air from the compressor 14. The cooling air is taken from the compressor 14 prior to discharge into the combustor 16 and delivered to the turbine 18 to cool the components in the turbine section 18. The flow of cooling air may flow through cooling passageways in the turbine vanes 22 and/or the bladed rotor assembly 24 to cool the components of the turbine 18 as shown in FIG. 2.

The flow of cooling air from the cooling air source 44 may flow from the annular cooling plenum 40 through cooling passageways 27 as shown in FIG. 2. Additionally, the cooling air may flow radially inward through the turbine vanes 22 and then radially outward through the bladed rotor 24 toward the inner case 32 of the case assembly 20.

The cooling air from the cooling air source 44, i.e. the compressed air from the compressor 14, is cooler and at a higher presser than the air flowing through the gas path 25 of the turbine section 18.

In the illustrative embodiment, the inner case 32 of the case assembly 20 includes a cooling hole 54 as shown in FIG. 3. The cooling hole 54 extends radially through the inner case 32. The cooling hole 54 opens to the gap 52 and the gas path 25 so that the gap 52 is in fluid communication with the gas path 25 as shown in FIG. 3. In this way, the pressure differential across the inner case 32 may be used to draw the flow of cooling air into the gap 52 underneath at least a portion of the sensor housing 46. The airflow will cool the radially-inwardly facing surface 50 of the sensor housing 46 by convection.

In some embodiments, the radially-inwardly facing surface 50 of the sensor housing 46 includes heat transfer features, such as protrusions, dimples, fins, pins, or other similar features to increase the efficiency of the heat transfer. In some embodiments, like in FIG. 7, the sensor housing 46 includes heat transfer features on other areas.

Turning again to the case assembly 20, the outer case 34 includes an outer case wall 36 and an outer case boss 38 as shown in FIG. 3. The outer case wall 36 extends circumferentially at least partway about the axis 11. The outer case boss 38 extends radially outward from the outer case wall 36.

In the illustrative embodiment, an opening 37 extends radially through the outer case wall 36 and the outer case boss 38 and is open to the annular cooling plenum 40. The sensor 42 extends into the opening 37 in the illustrative embodiment.

In the illustrative embodiment, the cooled tip clearance measurement system 26 includes a sensor mount 70 that couples to the outer case 34 to close the opening 37. The sensor 42 extends through the sensor mount 70 in the illustrative embodiment.

In the illustrative embodiment, the cover plate 60 is coupled to the outer case 34 to close the opening 37. The sensor 42 extends through the opening 37 in the outer case 34, the cover plate 60, and the sensor mount 70.

A method of monitoring and controlling the tip clearance during engine operation may include several steps. The method includes using the tip clearance sensor 42 to monitor the tip clearance T formed between the blades 30 on the bladed rotor 24 and the inner case 32 during operation of the gas turbine engine 10. While monitoring the tip clearance, the method further includes conducting the flow of cooling air into the annular cooling plenum 40 from the cooling air source 44 to transfer heat from the sensor 42 to the cooling air so as to cool the sensor 42 during operation of the gas turbine engine 10.

Figure 4:
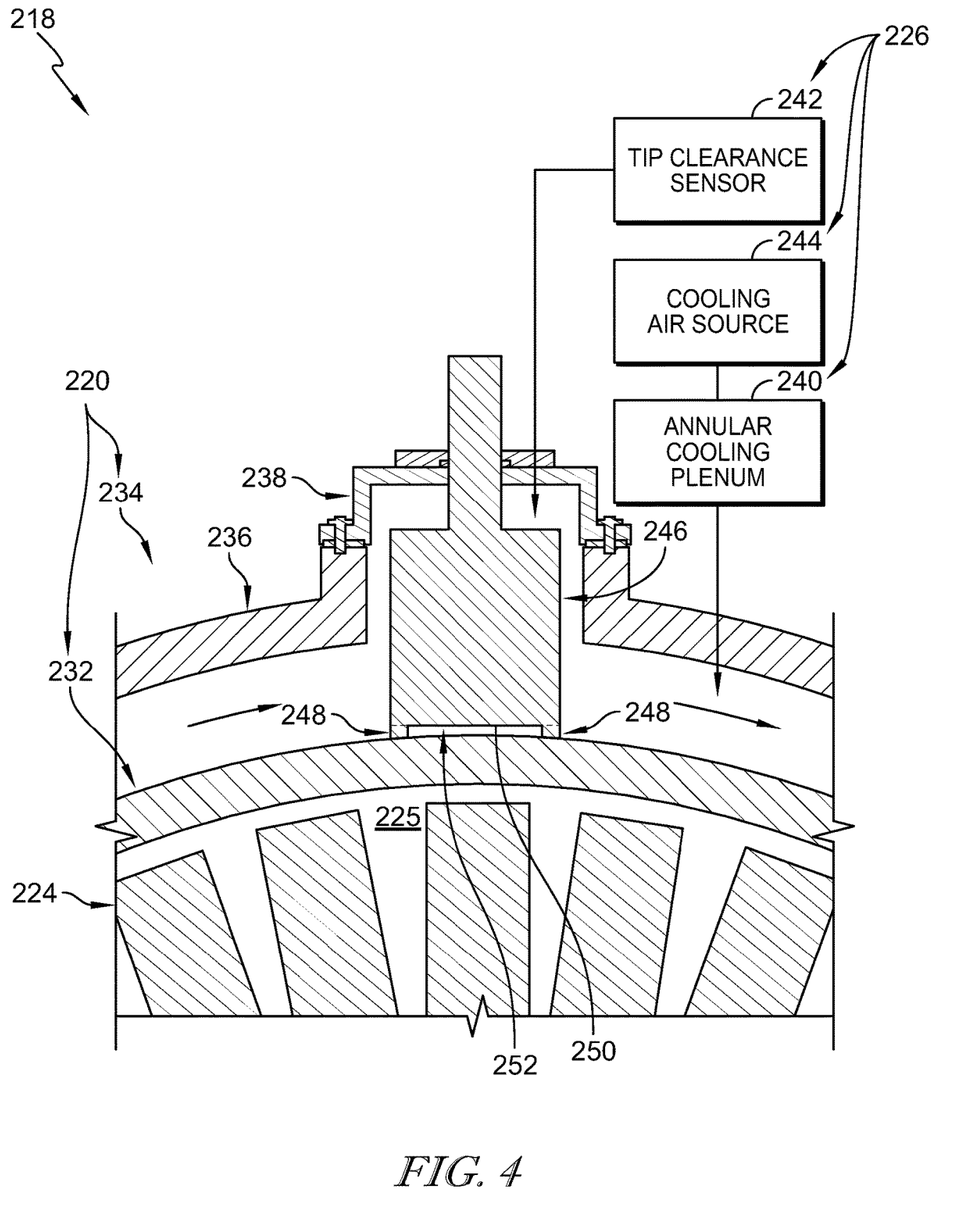
FIG. 4 is another embodiment of a cooled tip clearance measurement system adapted for use in the turbine section of FIG. 2 showing the inner case does not include a cooling hole like in FIG. 3.

Another embodiment of a turbine assembly 218 in accordance with the present disclosure is shown in FIG. 4. The turbine assembly 218 is substantially similar to the turbine assembly 18 shown in FIGS. 1-3 and described herein. Accordingly, similar reference numbers in the 200 series indicate features that are common between the turbine assembly 18 and the turbine assembly 218. The description of the turbine assembly 18 is incorporated by reference to apply to the turbine assembly 218, except in instances when it conflicts with the specific description and the drawings of the turbine assembly 218.

The turbine assembly 218 includes a case assembly 220, a bladed rotor 224, and a cooled tip clearance measurement system 226 as shown in FIG. 4. The case assembly 220 includes an inner case 232 that extends circumferentially around the bladed rotor 224 and an outer case 234 extends circumferentially around the inner case 232 radially outward of the inner case 232.

The cooled tip clearance measurement system 226 includes an annular cooling plenum 240, a tip clearance sensor 242, and a cooling air source 244 as shown in FIG. 4. The annular cooling plenum 240 is defined between the inner case 232 and the outer case 234 included in the case assembly 220. The tip clearance sensor 242 is located in the annular cooling plenum 240 to engage the inner case 232. The cooling air source 244 is in fluid communication with the annular cooling plenum 240 to supply a flow of cooling air to the annular cooling plenum 240 to transfer heat from the sensor 242 to the cooling air so as to cool the sensor during operation of the gas turbine engine.

The sensor 242 includes a sensor housing 246 and a plurality of stand-offs 248 as shown in FIG. 4. The sensor housing 246 defines a radially-inwardly facing surface 250. The plurality of housing stand-offs 248 that extend from the radially-inwardly facing surface 250 of the sensor housing 246 and engage the inner case 232 to space the radially-inwardly facing surface 250 apart from inner case 232 to define a gap 252 therebetween.

The gap 252 between the radially-inwardly facing surface 250 and the inner case 232 to allow the flow of cooling air to flow between the inner case 232 and the radially-inwardly facing surface 250 of the sensor housing 246. Unlike the inner case 32 in FIGS. 2 and 3, the inner case 232 of the case assembly 220 does not include a cooling hole so that the gap 252 is not in fluid communication with the gas path 225.

Figure 5:
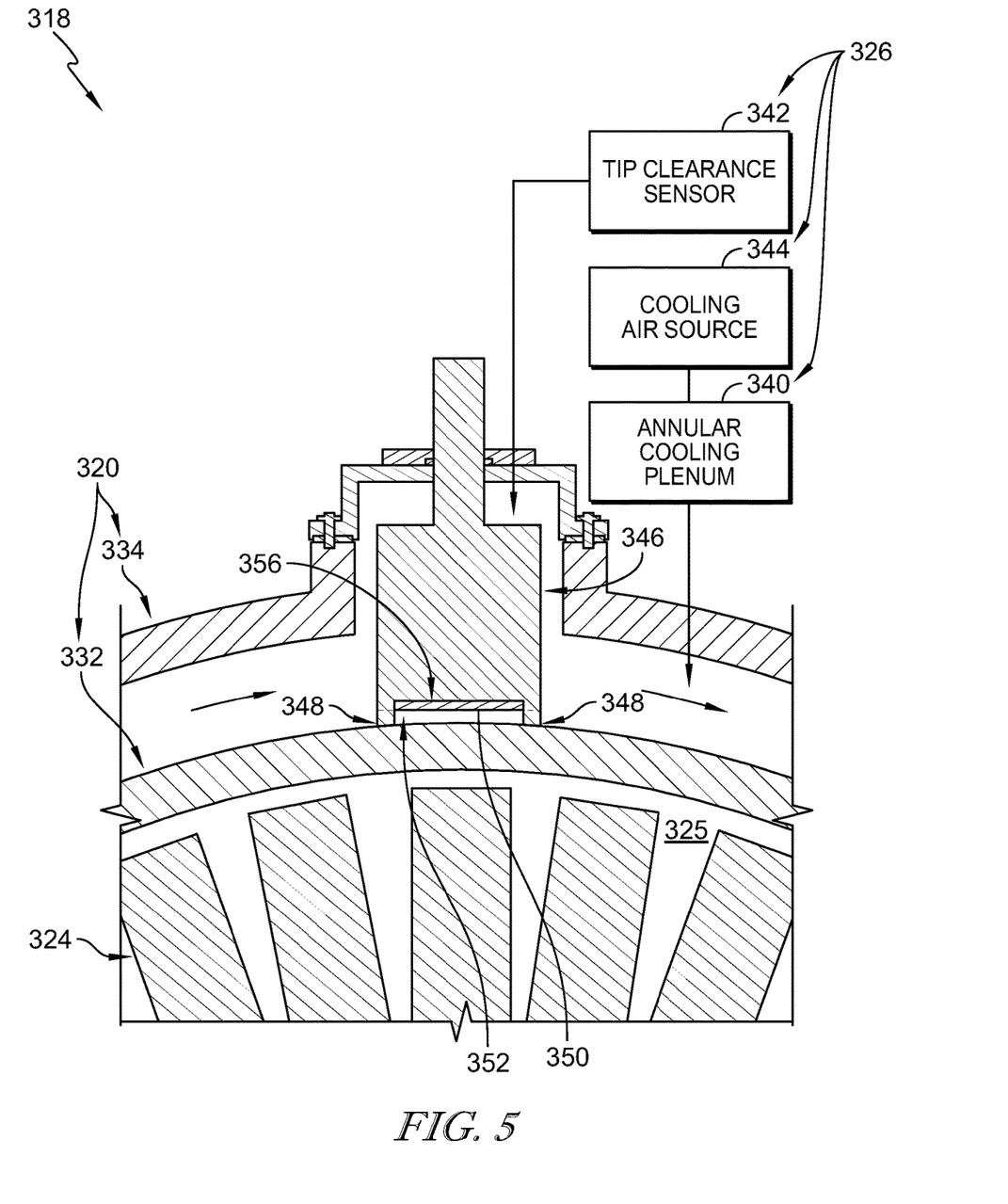
FIG. 5 is another embodiment of a cooled tip clearance measurement system adapted for use in the turbine section of FIG. 2 showing the sensor housing includes a thermal barrier coating layer that defines the radially-inwardly facing surface of the sensor housing.

Another embodiment of a turbine assembly 318 in accordance with the present disclosure is shown in FIG. 5. The turbine assembly 318 is substantially similar to the turbine assembly 18 shown in FIGS. 1-3 and described herein. Accordingly, similar reference numbers in the 300 series indicate features that are common between the turbine assembly 18 and the turbine assembly 318. The description of the turbine assembly 18 is incorporated by reference to apply to the turbine assembly 318, except in instances when it conflicts with the specific description and the drawings of the turbine assembly 318.

The turbine assembly 318 includes a case assembly 320, a bladed rotor 324, and a cooled tip clearance measurement system 326 as shown in FIG. 5. The case assembly 320 includes an inner case 332 that extends circumferentially around the bladed rotor 324 and an outer case 334 extends circumferentially around the inner case 332 radially outward of the inner case 332.

The cooled tip clearance measurement system 326 includes an annular cooling plenum 340, a tip clearance sensor 342, and a cooling air source 344 as shown in FIG. 5. The annular cooling plenum 340 is defined between the inner case 332 and the outer case 334 included in the case assembly 320. The tip clearance sensor 342 is located in the annular cooling plenum 340 to engage the inner case 332. The cooling air source 344 is in fluid communication with the annular cooling plenum 340 to supply a flow of cooling air to the annular cooling plenum 340 to transfer heat from the sensor 42 to the cooling air so as to cool the sensor during operation of the gas turbine engine.

The sensor 342 includes a sensor housing 346 and a plurality of stand-offs 348 as shown in FIG. 5. The sensor housing 346 defines a radially-inwardly facing surface 350. The plurality of housing stand-offs 348 that extend from the radially-inwardly facing surface 350 of the sensor housing 346 and engage the inner case 332 to space the radially-inwardly facing surface 350 apart from inner case 332 to define a gap 352 therebetween. The gap 352 between the radially-inwardly facing surface 350 and the inner case 332 to allow the flow of cooling air to flow between the inner case 332 and the radially-inwardly facing surface 350 of the sensor housing 346.

In the illustrative embodiment, the sensor housing 346 includes a thermal barrier coating layer 356 that defines the radially-inwardly facing surface 350 of the sensor housing 346 as shown in FIG. 5. The thermal barrier coating layer 356 is configured to insulate the sensor 342 to reduce the heat conduction between inner case 332 and the sensor housing 346.

Figure 6:
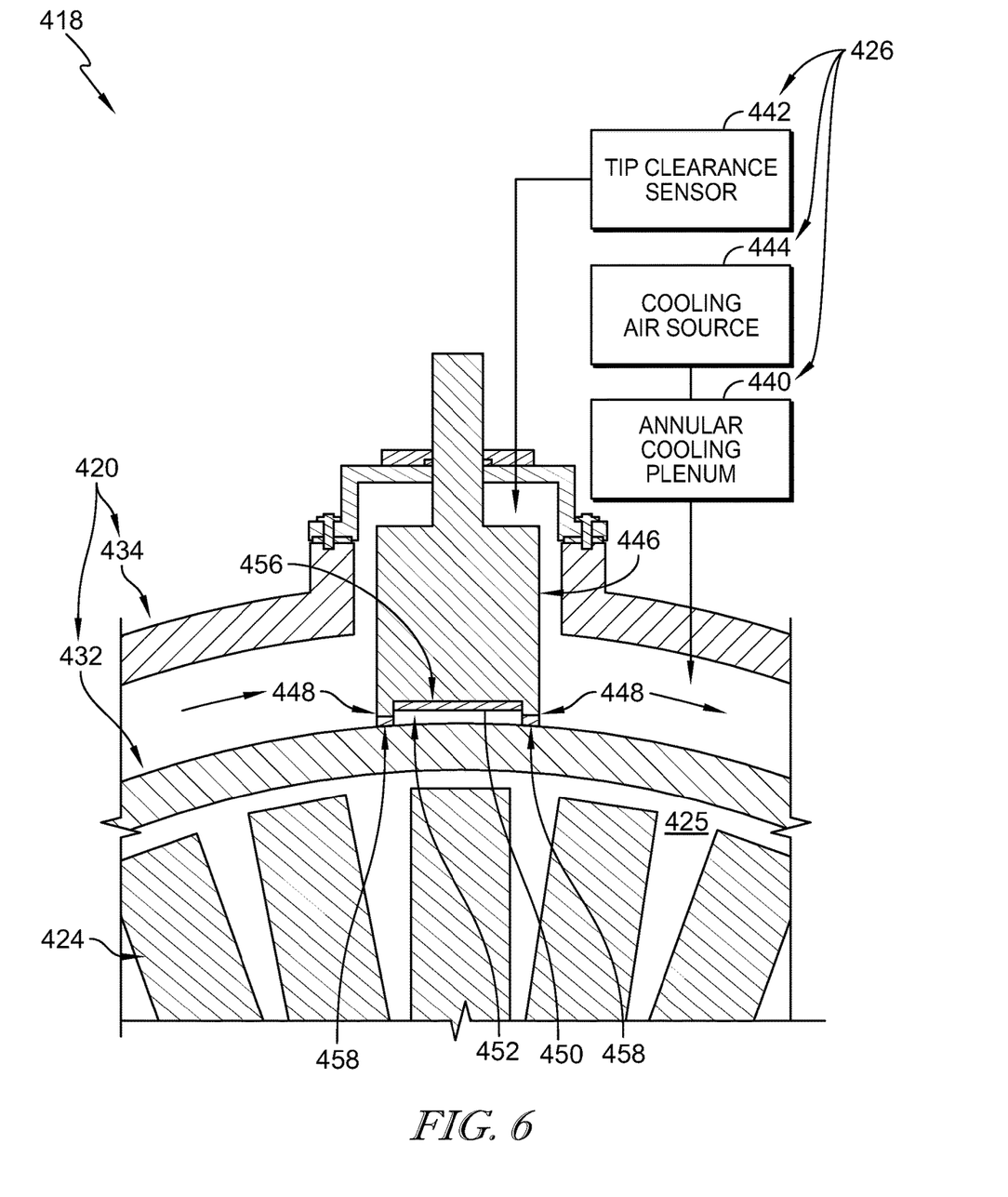
FIG. 6 is another embodiment of a cooled tip clearance measurement system adapted for use in the turbine section of FIG. 2 showing the sensor housing includes a first thermal barrier coating layer that defines the radially-inwardly facing surface of the sensor housing and second thermal barrier coating layers on the plurality of stand-offs.

Another embodiment of a turbine assembly 418 in accordance with the present disclosure is shown in FIG. 6. The turbine assembly 418 is substantially similar to the turbine assembly 18 shown in FIGS. 1-3 and described herein. Accordingly, similar reference numbers in the 440 series indicate features that are common between the turbine assembly 18 and the turbine assembly 418. The description of the turbine assembly 18 is incorporated by reference to apply to the turbine assembly 418, except in instances when it conflicts with the specific description and the drawings of the turbine assembly 418.

The turbine assembly 418 includes a case assembly 420, a bladed rotor 424, and a cooled tip clearance measurement system 426 as shown in FIG. 6. The case assembly 420 includes an inner case 432 that extends circumferentially around the bladed rotor 424 and an outer case 434 extends circumferentially around the inner case 432 radially outward of the inner case 432.

The cooled tip clearance measurement system 426 includes an annular cooling plenum 440, a tip clearance sensor 442, and a cooling air source 444 as shown in FIG. 6. The annular cooling plenum 440 is defined between the inner case 432 and the outer case 434 included in the case assembly 420. The tip clearance sensor 442 is located in the annular cooling plenum 440 to engage the inner case 432. The cooling air source 444 is in fluid communication with the annular cooling plenum 440 to supply a flow of cooling air to the annular cooling plenum 440 to transfer heat from the sensor 442 to the cooling air so as to cool the sensor during operation of the gas turbine engine.

The sensor 442 includes a sensor housing 446 and a plurality of stand-offs 448 as shown in FIG. 6. The sensor housing 446 defines a radially-inwardly facing surface 450. The plurality of housing stand-offs 448 that extend from the radially-inwardly facing surface 450 of the sensor housing 446 and engage the inner case 432 to space the radially-inwardly facing surface 450 apart from inner case 432 to define a gap 452 therebetween. The gap 452 between the radially-inwardly facing surface 450 and the inner case 432 to allow the flow of cooling air to flow between the inner case 432 and the radially-inwardly facing surface 450 of the sensor housing 446.

In the illustrative embodiment, the sensor housing 446 includes a first thermal barrier coating layer 456 that defines the radially-inwardly facing surface 450 of the sensor housing 446 as shown in FIG. 6. The thermal barrier coating layer 456 is configured to insulate the sensor 442 to reduce the heat conduction between inner case 432 and the sensor housing 446.

In the illustrative embodiment, the plurality of stand-offs 448 each includes a second thermal barrier coating layer 458 as shown in FIG. 6. The second thermal barrier coating layers 458 each engage the inner case 432. Like the first thermal barrier coating layer 456, the second thermal barrier coating layers 458 are configured to insulate the sensor 442 to reduce the heat conduction between inner case 432 and the sensor 442.

Figure 7:
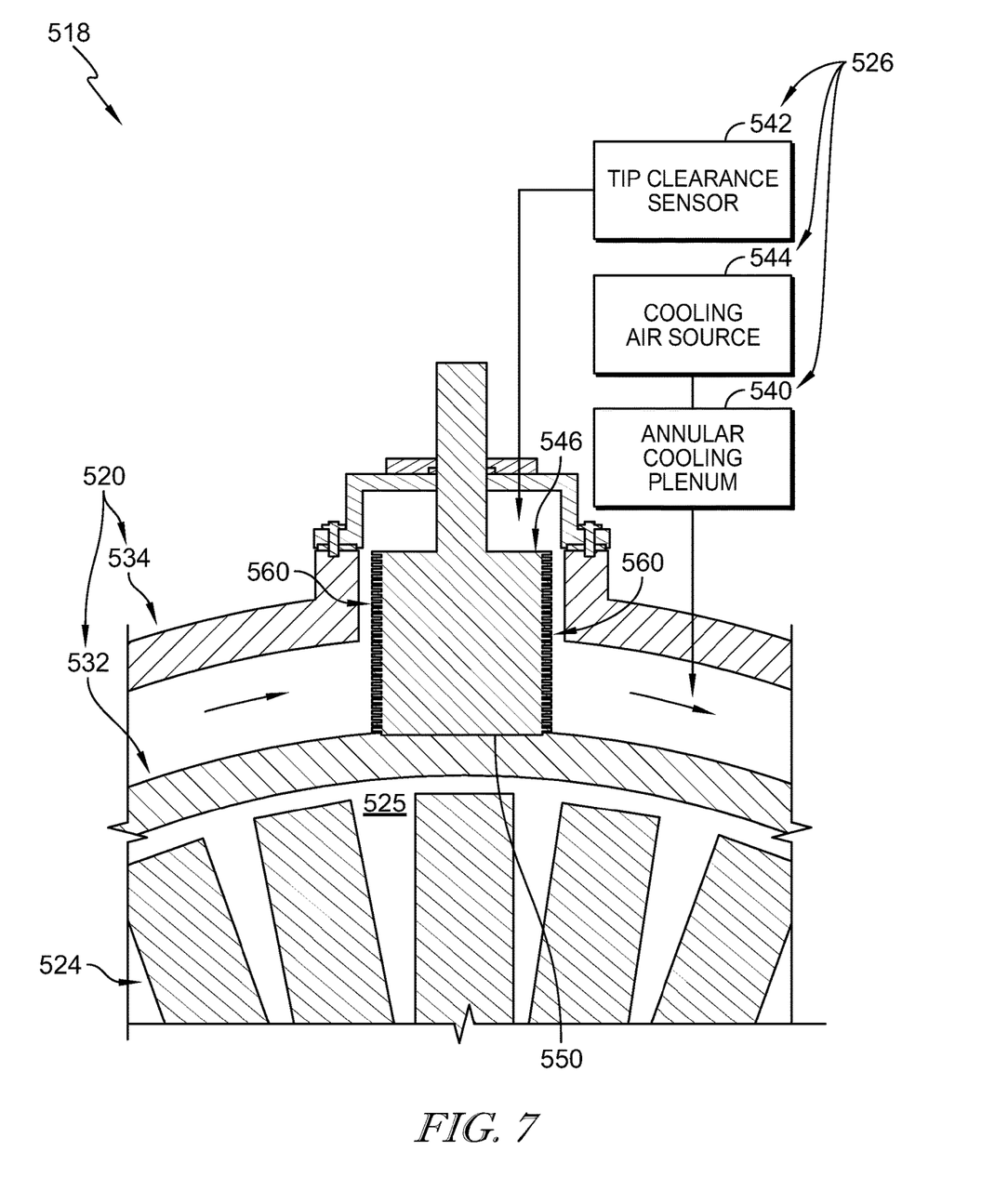
FIG. 7 is another embodiment of a cooled tip clearance measurement system adapted for use in the turbine section of FIG. 2 showing the sensor includes a sensor housing that defines a radially-inwardly facing surface that directly engages the inner case and a plurality of protrusions that extend away from the sensor housing into the annular cooling plenum to induce turbulence in the flow of cooling air supplied to the annular cooling plenum between the outer case and the inner case during operation of the gas turbine engine such that heat is more effectively transferred from the sensor to the cooling air.

Another embodiment of a turbine assembly 518 in accordance with the present disclosure is shown in FIG. 7. The turbine assembly 518 is substantially similar to the turbine assembly 18 shown in FIGS. 1-3 and described herein. Accordingly, similar reference numbers in the 440 series indicate features that are common between the turbine assembly 18 and the turbine assembly 518. The description of the turbine assembly 18 is incorporated by reference to apply to the turbine assembly 518, except in instances when it conflicts with the specific description and the drawings of the turbine assembly 518.

The turbine assembly 518 includes a case assembly 520, a bladed rotor 524, and a cooled tip clearance measurement system 526 as shown in FIG. 7. The case assembly 520 includes an inner case 532 that extends circumferentially around the bladed rotor 524 and an outer case 534 extends circumferentially around the inner case 532 radially outward of the inner case 532.

The cooled tip clearance measurement system 526 includes an annular cooling plenum 540, a tip clearance sensor 542, and a cooling air source 544 as shown in FIG. 7. The annular cooling plenum 540 is defined between the inner case 532 and the outer case 534 included in the case assembly 520. The tip clearance sensor 542 is located in the annular cooling plenum 540 to engage the inner case 532. The cooling air source 544 is in fluid communication with the annular cooling plenum 540 to supply a flow of cooling air to the annular cooling plenum 540 to transfer heat from the sensor 542 to the cooling air so as to cool the sensor during operation of the gas turbine engine.

The sensor 542 includes a sensor housing 546 and a plurality of protrusions 560 as shown in FIG. 7. The sensor housing 546 defines a radially-inwardly facing surface 550. The protrusions 560 extend away from the sensor housing 546 into the annular cooling plenum 540. The protrusions 560 are configured to increase the surface area in contact with, and induce turbulence in the flow of cooling air supplied to the annular cooling plenum 540 between the outer case 534 and the inner case 532 during operation of the gas turbine engine 10 such that heat is more effectively transferred from the sensor 542 to the cooling air.

In the illustrative embodiment, the radially-inwardly facing surface 550 of the sensor housing 546 is directly engaged with the inner case 532 as shown in FIG. 7. In some embodiments, the sensor 542 may include a plurality of stand-offs like the other embodiments that space the radially-inwardly facing surface 550 radially apart from the inner case 532. In some embodiments, the sensor housing 546 may include a thermal barrier coating layer that defines the radially-inwardly facing surface 550.

Figure 8:
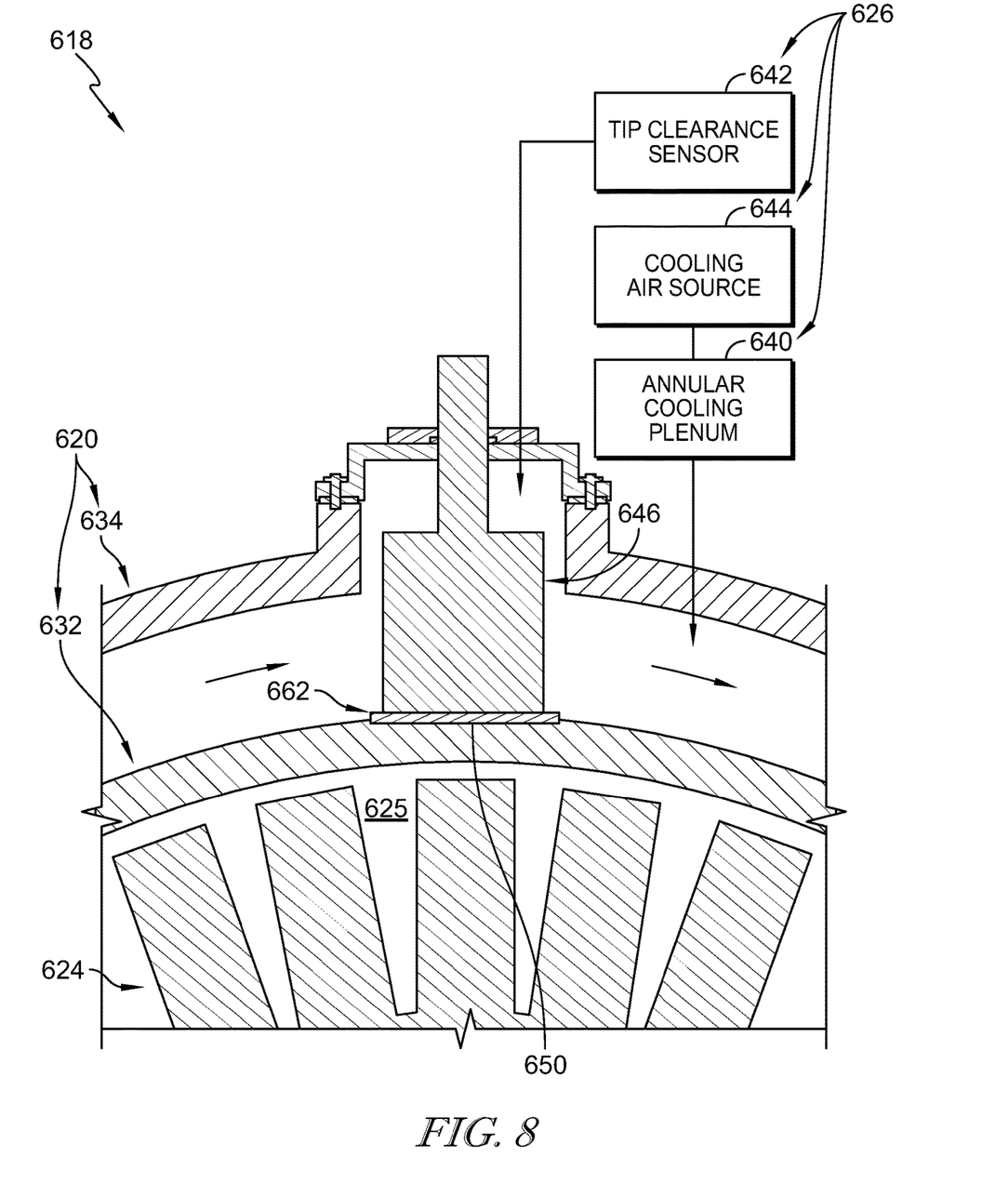
FIG. 8 is another embodiment of a cooled tip clearance measurement system adapted for use in the turbine section of FIG. 2 showing the sensor housing includes a thermal barrier coating layer that defines the radially-inwardly facing surface of the sensor housing that directly engages the inner case.

Another embodiment of a turbine assembly 618 in accordance with the present disclosure is shown in FIG. 8. The turbine assembly 618 is substantially similar to the turbine assembly 18 shown in FIGS. 1-3 and described herein. Accordingly, similar reference numbers in the 600 series indicate features that are common between the turbine assembly 18 and the turbine assembly 618. The description of the turbine assembly 18 is incorporated by reference to apply to the turbine assembly 618, except in instances when it conflicts with the specific description and the drawings of the turbine assembly 618.

The turbine assembly 618 includes a case assembly 620, a bladed rotor 624, and a cooled tip clearance measurement system 626 as shown in FIG. 8. The case assembly 620 includes an inner case 632 that extends circumferentially around the bladed rotor 624 and an outer case 634 extends circumferentially around the inner case 632 radially outward of the inner case 632.

The cooled tip clearance measurement system 626 includes an annular cooling plenum 640, a tip clearance sensor 642, and a cooling air source 644 as shown in FIG. 8. The annular cooling plenum 640 is defined between the inner case 632 and the outer case 634 included in the case assembly 620. The tip clearance sensor 642 is located in the annular cooling plenum 640 to engage the inner case 632. The cooling air source 644 is in fluid communication with the annular cooling plenum 640 to supply a flow of cooling air to the annular cooling plenum 640 to transfer heat from the sensor 642 to the cooling air so as to cool the sensor during operation of the gas turbine engine.

The sensor 642 includes a sensor housing 646 that defines a radially-inwardly facing surface 650 that directly engages the inner case 532 as shown in FIG. 8. In the illustrative embodiment, the sensor housing 646 includes a thermal barrier coating layer 662 that defines the radially-inwardly facing surface 650 of the sensor housing 646.

The thermal barrier coating layer 662 is configured to insulate the sensor 642 to reduce the heat conduction between inner case 632 and the sensor housing 646. In the illustrative embodiment, the thermal barrier coating layer 662 directly engages the inner case 632.

The present invention is a method to cool a tip clearance sensor 42, 242, 342, 442, 542, 642 in a gas turbine engine 10. This invention may be used in either the compressor 14 or turbine 18 of the engine 10; however, the example embodiment discussed here is mounted in the turbine 18.

The blades 30 are typically arranged around the outer diameter of a rotor 28. Stages of one or more bladed discs may be coaxially assembled to form a rotor which rotates about the axis 11. The bladed rotor 24 is housed with a static structure which may include an inner case 32 and an outer case 34. The inner surface of the static structure which is immediately adjacent to the tips of the blades 30 and surrounds the bladed rotor 24 may be referred to as the blade track. The blade track may be part of a separate component that attaches to the inner case 32, or it may be integral to the inner case 32 itself.

The radial distance between the tips of the blades 30 and the surrounding blade track 32 is the tip clearance T, which may be important to gas turbine engine performance. Sensors 42 may be used to monitor the tip clearance T during engine operation and may also be incorporated into an active control system which can measure and adjust the turbine tip clearance T for optimum performance.

To provide an accurate measurement, the sensor 42, 242, 342, 442, 542, 642 needs to be contact with the inner case 32, 232, 332, 432, 532, 632, which carries the blade track. Temperatures in this region of the engine 10 may exceed the capability of electronic or magnetic sensor components. Therefore, the sensor 42, 242, 342, 442, 542, 642 may need to be cooled.

Feet or stand-offs 48, 248, 348, 448 may be used on the bottom of the sensor housing 46, 246, 346, 446 to create an insulating air gap 52, 252, 352, 452 between the housing 46, 246, 346, 446 and the hot inner case 32, 232, 332, 432.

Cooling air supplied to the annular cooling plenum 40, 240, 340, 440 cools the sensor 42, 242, 342 442 through convective heat transfer. However, the cooling benefit may be limited without motivating the airflow between the housing 46, 246, 346, 446 and the inner case 32, 232, 332, 432. As shown in FIG. 3, the inner case 32 includes a cooling hole 54 that opens to the gap 52 and the gas path 25. The cooling hole 54 causes the high pressure cooling air to be drawn into the gap 52 underneath the sensor housing 46. The airflow into the gap 52 will cool the bottom of the sensor housing 46 by convection. Dimples, fins, pins, or other similar features may be employed on the radially-inwardly facing surface 50 of the sensor housing 46 to increase the efficiency of the heat transfer.

In some embodiments, like in FIG. 7, the exterior of the sensor housing 546 has cooling features to facilitate the extraction of heat from inside the housing 546. The features may be protrusions, pins, fins, dimples, turbulators, or other features which increase the efficiency of the heat transfer. The exterior of the housing 546 may be cooled by the compressor bleed or discharge air moving through the plenum 540 between the inner case 532 and the outer case 534. The cooling air may be from another cooling air source 44, 244, 344, 444, 544, 644 such as nacelle air or external air from an air scoop or motivated by a blower.

A method to isolate the sensor housing 46, 246, 346, 446 from the hot inner case 32, 232, 332, 432 uses feet or stand-offs 48, 248, 348, 448 on the bottom of the sensor housing 46, 246, 346, 446 to create an air gap 52, 252, 352, 452 between the housing 46, 246, 346, 446 and the hot inner case 32, 232, 332, 432 as shown in FIGS. 3-6. This may also reduce the heat conduction between the inner case 32, 232, 332, 432 and the sensor housing 46, 246, 346, 446 and allow the cooler cavity air to circulate through the air gap 52, 252, 352, 452.

Another method to isolate the sensor housing 346, 446, 646 from the hot inner case 332, 432, 632 uses a thermal barrier coating layer 356, 456, 458, 662 on the bottom of the sensor housing 346, 446, 646 as shown in FIGS. 5, 6, and 8. This reduces the heat conduction between the inner case 332, 432, 632 and the sensor housing 346, 446, 646.

The thermal barrier coating layer 356, 456, 458 may be employed on sensors 342, 442 with stand-offs 348, 448 that create the air gap 352, 452 between the sensor housing 346, 446 and the hot inner case 332, 432. Further, the thermal barrier coating layer 458 may be applied to the stand-offs 448, or as the stand-offs 448 themselves.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine assembly adapted for use in a gas turbine engine, the turbine assembly comprising
   a bladed rotor mounted for rotation about an axis of the gas turbine engine,
   a case assembly including an inner case that extends circumferentially around the bladed rotor to define an outer boundary of a gas path of the turbine assembly to block combustion products from moving through the gas path of the turbine assembly without interaction with blades on the bladed rotor and an outer case that extends circumferentially around the inner case and is spaced radially outward of the inner case to define an annular cooling plenum therebetween and configured to be flooded with cooling air at a temperature lower than a temperature of the combustion products, and a cooled tip clearance measurement system including the annular cooling plenum defined between the inner case and the outer case and a tip clearance sensor located in the annular cooling plenum to engage the inner case radially outward of the gas path of the turbine assembly and configured to monitor a tip clearance formed between the bladed rotor and the inner case during operation of the gas turbine engine, wherein the tip clearance sensor includes a sensor housing that defines a radially-inwardly facing surface and a plurality of housing stand-offs that extend from the radially-inwardly facing surface of the sensor housing and engage the inner case to space the radially-inwardly facing surface apart from the inner case to define a gap therebetween to allow a flow of the cooling air to flow between the inner case and at least a portion of the radially-inwardly facing surface of the sensor housing.

2. The turbine assembly of claim 1, wherein the inner case is formed to define a cooling hole that extends radially through the inner case and opens to the gap and the gas path so that the gap is in fluid communication with the gas path.

3. The turbine assembly of claim 2, wherein the sensor housing includes a thermal barrier coating layer that defines the radially-inwardly facing surface of the sensor housing.

4. The turbine assembly of claim 1, wherein the sensor housing includes a thermal barrier coating layer that defines the radially-inwardly facing surface of the sensor housing.

5. The turbine assembly of claim 4, wherein the plurality of stand-offs each includes a thermal barrier coating layer that engages the inner case.

6. A gas turbine engine comprising
a compressor configured to compress air drawn in to the gas turbine engine and discharge pressurized air,
a combustor configured to mix fuel with the pressurized air from the compressor and ignites the fuel to produce combustion products,
a turbine assembly configured to receive the combustion products and to extract mechanical work from the combustion products as the combustion products move through the turbine assembly, the turbine assembly including
a bladed rotor mounted for rotation about an axis of the gas turbine engine,
a case assembly including an inner case that extends circumferentially around the bladed rotor to define an outer boundary of a gas path of the turbine assembly to block the combustion products from moving through the gas path of the turbine assembly without interaction with blades on the bladed rotor and an outer case that extends circumferentially around the inner case and is spaced radially outward of the inner case to define an annular cooling plenum therebetween and configured to be flooded with cooling air at a temperature lower than a temperature of the combustion products, and a cooled tip clearance measurement system including the annular cooling plenum defined between the inner case and the outer case, a tip clearance sensor located in the annular cooling plenum to engage the inner case and configured to monitor a tip clearance formed between the bladed rotor and the inner case, and a cooling air source in fluid communication with the annular cooling plenum to supply a flow of the cooling air to the annular cooling plenum to transfer heat from the tip clearance sensor to the flow of the cooling air so as to cool the tip clearance sensor during operation of the gas turbine engine, wherein the tip clearance sensor includes a sensor housing that defines a radially-inwardly facing surface and a plurality of housing stand-offs that extend from the radially-inwardly facing surface of the sensor housing and engage the inner case to space the radially-inwardly facing surface apart from the inner case to define a gap therebetween to allow the flow of the cooling air to flow between the inner case and at least a portion of the radially-inwardly facing surface of the sensor housing.

7. The gas turbine engine of claim 6, wherein the inner case is formed to define a cooling hole that extends radially through the inner case and opens to the gap and the gas path of the gas turbine engine so that the gap is in fluid communication with the gas path.

8. The gas turbine engine of claim 6, wherein the sensor housing includes a thermal barrier coating layer that defines the radially-inwardly facing surface of the sensor housing.

9. The gas turbine engine of claim 8, wherein the plurality of stand-offs each includes a thermal barrier coating layer that engages the inner case.

10. The gas turbine engine of claim 6, wherein the cooling air source is air from the compressor.

* * * * *